H. KLECKLER.
AEROPLANE WING HINGE.
APPLICATION FILED APR. 16, 1917.

1,246,028.

Patented Nov. 6, 1917.
2 SHEETS—SHEET 1.

Inventor
HENRY KLECKLER.

By

Attorney

H. KLECKLER.
AEROPLANE WING HINGE.
APPLICATION FILED APR. 16, 1917.
1,246,028.
Patented Nov. 6, 1917.
2 SHEETS—SHEET 2.
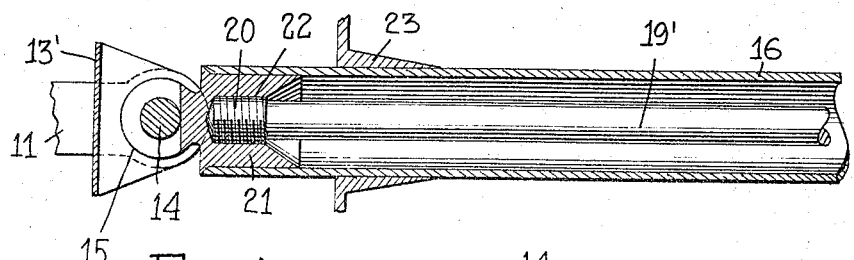
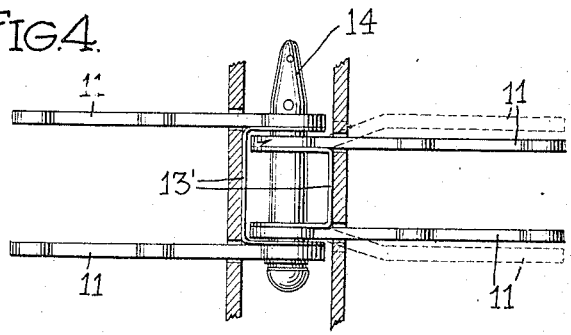
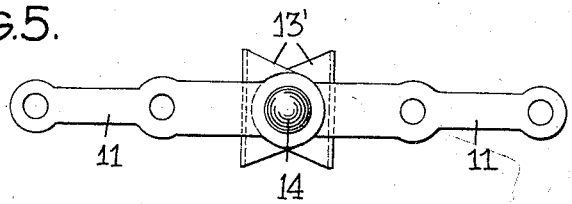
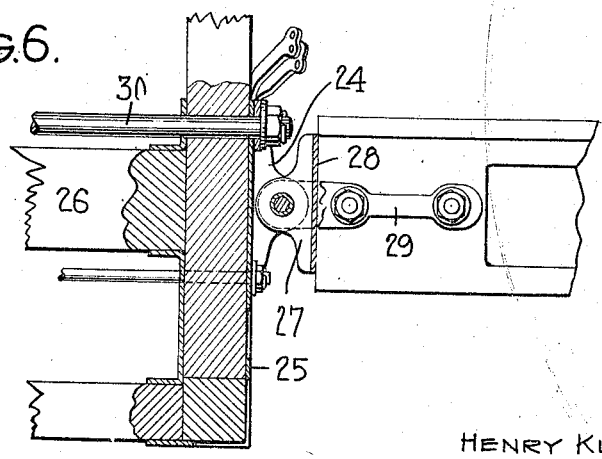
Inventor
HENRY KLECKLER.
By
Attorney

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

AEROPLANE-WING HINGE.

1,246,028.  Specification of Letters Patent.  Patented Nov. 6, 1917.

Application filed April 16, 1917. Serial No. 162,533.

*To all whom it may concern:*

Be it known that I, HENRY KLECKLER, a citizen of the United States, residing at Buffalo, in the county of Erie and State of New York, have invented certain new and useful Improvements in Aeroplane-Wing Hinges, of which the following is a specification.

My invention relates to aeroplane fittings and more particularly to aeroplane wing hinges.

The characteristic of the invention is the hinge construction; also its location with respect to the wing beam of the wing. The hinge plates of the wing hinge instead of being placed in planes parallel to the plane of the wing, engage with the vertical sides of the wing beam (or beams) in planes normal thereto. These plates are let through the end ribs of the framework of the wing and have their ends joined together by a substantially U-shaped compression member so situated with respect to the wing that its bight portion is in engagement therewith. Said bight portion preferably abuts the end rib of the wing at a point in alinement with said beam. Moreover, the hinge pin passes through both hinge plates and through the extensions of the compression member.

There is a tendency under existing conditions to disrupt and distort the hinge plate fastening devices. This tendency is completely eliminated by the hinge construction herein disclosed. The location of the compression member intermediate the wing and the hinge pin with its bight portion in abutting engagement with the wing is such that compression strains are borne by the wing beam and not entirely by the plate fastening devices as heretofore.

Another advantage obtained through the use of a compression member under the conditions disclosed is that the hinge plates are joined together and rigidly held in perfect alinement so that the fastening devices and the hinge pin can be removed and replaced with the utmost ease. Furthermore, an increased metal bearing surface for the hinge pin is provided.

Of the drawings, wherein like characters of reference designate like or corresponding parts:—

Fig. 3 is a longitudinal sectional view;

Fig. 4 is a plan view of a modified type of hinge;

Fig. 5 is a side elevation of the hinge illustrated in Fig. 4, and

Fig. 6 is a part sectional and part elevational view of a still further modified type of hinge.

Figure 1:
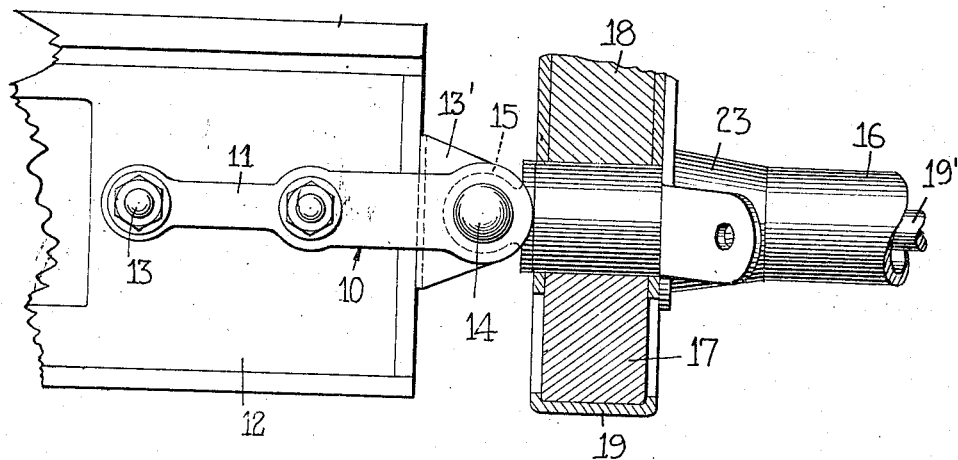
Figure 1 is a side elevation of a wing hinge including in its *ensemble* the several elements herein disclosed as constituting the improved wing hinge.
Figure 2:
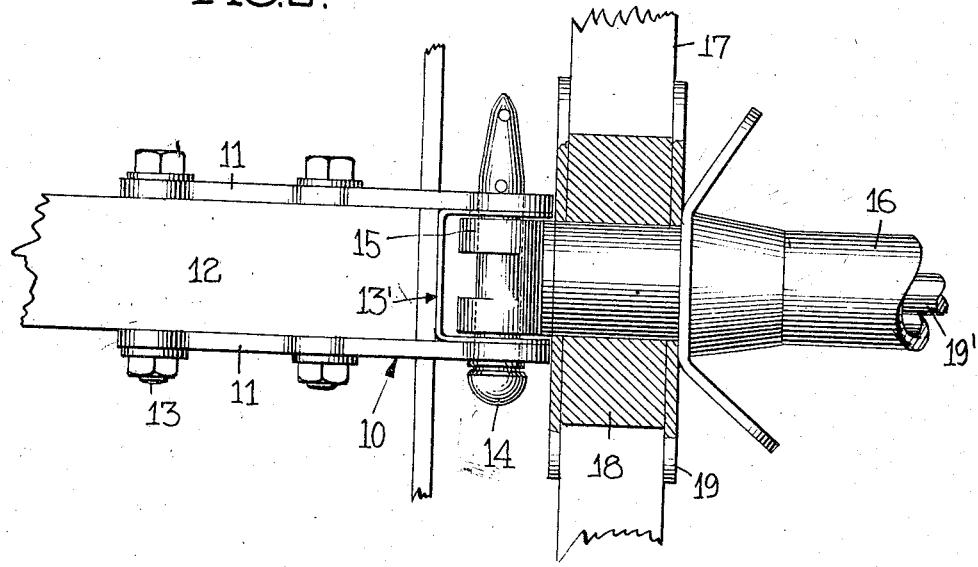
Fig. 2 is a top plan view of the wing hinge as illustrated in Fig. 1.

Referring first to Figs. 1, 2 and 3, wherein the preferred embodiment of the invention is disclosed, it will be noted that the wing hinge, designated in its entirety by the numeral 10, is made up of a number of connected parts. These parts may be varied and modified considerably in form without departing in any way from the generic spirit of the invention as disclosed. Broadly, the wing hinge of my invention comprises hinge plates 11—11 engageable respectively with opposite faces of the wing beam, designated 12, together with compression means arranged between said plates, preferably in alinement with said beam. The plates 11 instead of being placed as heretofore in planes parallel to the plane of the wing are on the vertical sides of the beam in planes normal thereto and (see Fig. 1) are fastened in place by through bolts 13 passing transversely through the beam. Said plates 11 are let through the end transverse rib of the wing and have their ends joined together by said compression means. This compression means as shown is in the form of a U-shaped compression plate having its bight portion disposed in abutting engagement with the end of the wing and in alinement with the beam 12 to which the plates 11 are fastened. Said compression plate is designated in its entirety by the numeral 13'. The extensions of the compression plate lie flush against the outer (with respect to the wing structure) ends of the plates 11 and may be brazed or otherwise rigidly fastened or secured thereto. The plates 11 are thus held in perfect lateral alinement so that the fastening devices 13 and the hinge pin may be removed and replaced with the utmost ease. Said hinge pin, designated 14, passes through both plates 11 and the extensions of the compression member 13'; also, in the preferred embodiment of the invention, 11' through hinge ears 14 formed integrally upon the extremities of a tie tube 16 arranged to pass transversely through the fuselage of the craft for intertying and interbracing the lower opposed panels or wing. The panels or wings of the upper surface are coupled up and the panels hingedly connected or fastened together by a type of hinge such as is shown in Figs. 4 and 5.

One of the lower longerons of the fuselage is shown in Figs. 1 and 2, also one of the vertically extending fuselage posts or struts. The longeron, designated 17, and the strut, designated 18, are fastened together by a fuselage fitting 19 constructed to embrace the longeron and overlap the vertical sides of the strut.

The tie tube 16 is hollow throughout and interiorly equipped with a tension rod 19′ terminally threaded as at 20. Plugs 21, interiorly threaded as at 22, engage the threaded terminals of the rod 19. These plugs 21 engage in the terminals of the tube 16 (see Fig. 3) and have the hinge ears 15 formed integrally thereon. Said tube, if desired, may be provided with an adjustable collar 23 which serves as an abutment preventing displacement of the elements of the fuselage under undue compression strains. Moreover, the hinge connection disclosed, i. e., the tie tube, is characterized by unusual lightness and strength.

In the embodiment of the invention illustrated in Figs. 4 and 5, duplicate hinge sections are used, the hinge plates 11 of the connected sections being unequally spaced so that the plates of one section may terminally engage between the correspondingly formed ends of the other. Both sets or pairs of hinge plates in this type of hinge are equipped with compression members, said members in each instance serving a like purpose, and a purpose similar to that disclosed in connection with the compression member 13′. If desired, where the beams are of equal width, the hinge plates of one section may be spread apart as indicated by dotted lines in Fig. 4.

In Fig. 6 a somewhat different type of hinge connection is disclosed. Hinge ears 24 are formed upon a fitting 25 of the fuselage in alinement with a compression member 26. Said ears 24 receive between them the extensions 27 of a compression member 28 corresponding to the compression member 13′ of the preferred type of hinge. Said member 28 abuts the end of the wing beam in connection with which this type of hinge is used and is fastened to said beam by plates 29. Tension rods 30 are also used in lieu of the tension rod 19.

In each wing hinge disclosed it will be noted that the compression member is located between the hinge plates of the wing hinge in such manner that its bight portion may engage with the end of the wing. In this way, compression strains are borne by the wing in its entirety since the point of contact between the compression member and the wing is in alinement with the wing beam founding the wing. Where wing panels are to be joined or fastened the hinge parts may be duplicated as in Figs. 4 and 5 the purpose of the hinge elements in each instance being the same.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. A wing hinge for aeroplanes including hinge plates engageable with the wing beam of the wing together with a wing-engaging compression means arranged between said plates.

2. A wing hinge for aeroplanes including hinge plates engageable respectively with opposite faces of the wing beam of the wing together with compression means in the form of a substantially U-shaped plate arranged between said hinge plates with its bight portion in engagement with the wing.

3. A wing hinge for aeroplanes including hinge plates engageable respectively with opposite faces of the wing beam of the wing in planes normal to the plane of the wing together with compression means in engagement with said plates and in alinement with said beam.

4. A wing hinge for aeroplanes including hinge plates engageable respectively with opposite faces of the wing beam of the wing together with a substantially U-shaped compression member having its bight portion in engagement with said wing at a point in alinement with the beam.

5. The combination with an aeroplane wing including in its *ensemble* a beam and a transverse rib, of a wing hinge comprising hinge plates let through said rib for engagement respectively with opposite faces of said beam.

6. The combination with an aeroplane wing including in its *ensemble* a beam and a transverse rib, of a wing hinge comprising hinge plates let through said rib for engagement respectively with opposite faces of said beam together with compression means engaging said wing in alinement with said beam.

7. The combination with an aeroplane wing including in its *ensemble* a beam and a transverse rib, of a wing hinge comprising hinge plates let through said rib for engagement respectively with opposite faces of the beam in planes normal to the plane of the wing, a substantially U-shaped compression member disposed between said hinge plates with its bight portion in engagement with said wing, and means penetrating the extremities of the compression member and the hinge plate for hingedly mounting said wing.

8. A wing hinge for aeroplanes including hinge plates engageable respectively with opposite faces of the wing beam of the wing, a substantially U-shaped compression member arranged between said plates with its bight portion in engagement with said wing and in substantial alinement with said beam, and a hinge pin penetrating the extensions of the compression member and both hinge plates for hingedly mounting the wing.

9. A wing hinge for aeroplanes including hinge plates, a substantially U-shaped compression member arranged between said plates with its extensions contiguous thereto and its bight portion in engagement with the wing, and means commonly penetrating said extensions and said plates for hingedly mounting the wing.

10. A wing hinge for aeroplanes including separately formed hinge plates together with a compression member interconnecting them.

11. A wing hinge for aeroplanes including a plurality of hinged parts having one of their number so arranged relatively to the wing and to the remaining hinge parts that it functions both as a connection between said remaining hinge parts and as a compression member for bearing the wing compression strains.

In testimony whereof I hereunto affix my signature.

HENRY KLECKLER.